June 20, 1967 F. COVA ET AL 3,326,099

SAFETY BARRIER FOR ROADWAYS

Filed Feb. 16, 1965

Fedele Cova,
Sergio De Amicis
and Giorgio Pellegrini, Inventors
By Wenderoth, Lind & Ponack
Attys.

United States Patent Office 3,326,099
Patented June 20, 1967

3,326,099
SAFETY BARRIER FOR ROADWAYS
Fedele Cova, Sergio De Amicis, and Giorgio Pellegrini, Rome, Italy, assignors to Autostrade Concessioni e Construzioni Autostrade S.p.A. and Vianini Società per Azioni, Rome, Italy
Filed Feb. 16, 1965, Ser. No. 432,988
Claims priority, application Italy, Feb. 18, 1964, 3,386/64
2 Claims. (Cl. 94—31)

ABSTRACT OF THE DISCLOSURE

The safety barrier comprises a plurality of heavy elements resting on the ground, one beside the other with connecting means passing through at least one longitudinal bore in each of said elements. The elements have side faces which match and are shape so as to allow a slight mutual rotation of the elements about vertical axes with locking means for tensioning and locking the ends of the connecting means projecting from the bores of the first and the last heavy element. The construction will avoid the danger of bouncing a heavy vehicle back into traffic.

---

The present invention relates to a safety barrier for roadways.

An object of the present invention is to provide a safety barrier adapted to be deformed under the impact and to maintain said deformation also after the impact has occurred, without returning said action so as to avoid the danger of bouncing the vehicle back into the traffic lane where other vehicles travel.

An object of this invention is to provide a safety barrier adapted to be easily set back onto its original place after the impact without any substantial damages of its elements.

The barrier according to the present invention comprises in combination a plurality of heavy elements simply resting on the ground one beside the other, connecting means passing through at least one longitudinal bore of each of said elements, said elements having side faces matching with one another and shaped to allow a slight mutual rotation of said elements about vertical axes and locking means for tensioning and locking the ends of said connecting means projecting from the bores of the first and last heavy element.

The safety barrier, according to this invention reacts to the impact by its own inertia, and dissipates most of the kinetic energy of the vehicle by friction due to the rotary movement of the matching faces of the element and to the displacement of these elements on the ground.

Owing to the connection between the sequential elements, at each impact the entire set of elements will be interested, with a maximum crosswise deflection ranging from few centimeters in case of slight impacts to some tenths of centimeters in case of more violent impacts.

In order to limit the transverse deflection without impairing the efficacity of the barrier it is possible to arrange two sets of parallel elements, leaving a certain gap between the two sets, so that while for slight impacts only one set will be interested, in case of stronger impacts both sets will be interested.

Therefore, a vehicle, after an impact has occurred will continue its stroke with a very reduced reflection angle, without bouncing back violently in the roadway.

The safety barrier according to this invention is, therefore, particularly adapted for the modern highway as it avoids that the vehicle goes out from the roadway or passes to the opposite roadway, simultaneously preventing it from bouncing back in the travelled roadway.

These and other purposes and advantages of the present invention will be readily understood upon the following description of the drawings.

Figure 1:
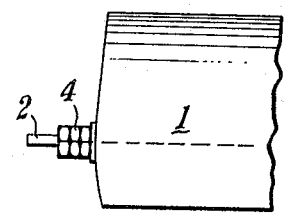
FIG. 1 is a top plane view of a first embodiment of the barrier according to this invention.

With reference to FIG. 1, the numeral reference 1 denotes the various elements of the barrier, each consisting of a suitable shaped block, preferably made of concrete and the height of which can be suitably about 60 cm., so as to be little higher than the height of the center of gravity over the ground of an average vehicle. The weight of each single element 1 will preferably be from 300 to 500 kgs.

Figure 2:
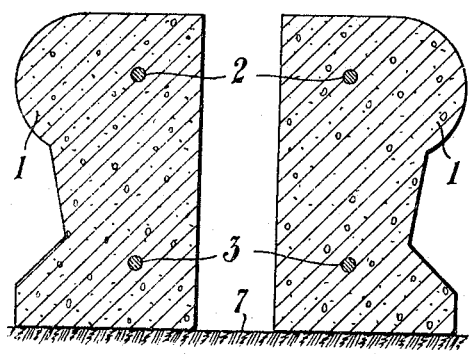
FIG. 2 is a cross sectional view taken along the line II—II of FIG. 1.

The elements 1 of the FIGS. 1 and 2 are preferably connected end-to-end and in correspondence of said connections said elements have, in top plane view, slightly arc shaped surfaces so as to allow little mutual rotations about vertical axes. The connection members consist of two steel chains 2 and 3 passing through suitable bores of said elements.

The illustrated barrier is destined to be located on the median of a divided highway, and in the case of FIGS. 1 and 2 it consists of lengths parallel in pairs and staggered of sets of elements 1, located at a little angle with respect to the axis of the highway, so as to compensate the effect of the staggering of said lengths and this in order to render accessible the end of each length (for instance one hundredth of metres) of chained elements 1, in order to allow the chains to be tensioned and fixed by the nuts 4.

As clearly shown in FIG. 2, the elements 1 of both sets are equal and faced to each other. Said elements have inside a flat surface, and outside, i.e. towards the respective roadway, a shape suitably studied to adapt in the best way to the structure of the vehicles possibly striking the elements.

Figure 3:
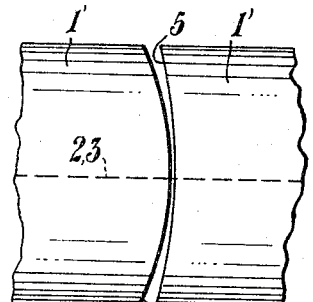
FIG. 3 is a top plane view of part of two elements of a second embodiment of the barrier.

The type of barrier as shown in FIG. 3 has a single sets of elements 1' which are therefore symmetrically shaped with respect to their vertical plane passing through the longitudinal axis. Further, each element terminates at one of its ends by a concave surface 5 and at its other end by a convex surface 6 so that when the chains 2, 3 are tensioned, each pair of adjoining elements 1' will be self-centering in correspondence with said abutment surfaces 5 and 6.

As aforesaid and as it has been shown in the figures, the barriers according to the present invention are simply resting on the ground 7 and react to the impacts only due to their own inertia. Said barriers are widely deformable and practically free from elastic return, so as to afford the best features of use.

It is also to be remarked that on said barriers it would be possible to mount suitable anti-glare devices.

Figure 4:
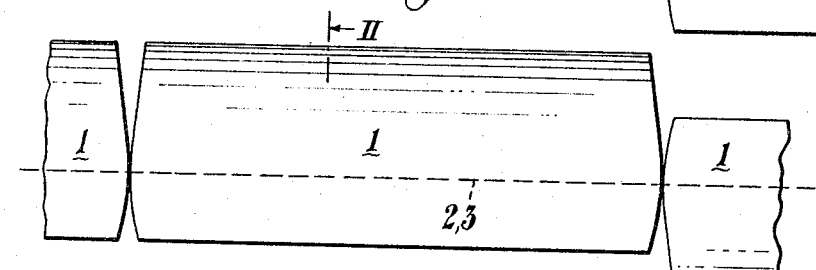
FIG. 4 is a side elevational view in reduced scale of part of two elements of a third embodiment of the barrier.
Figure 4:
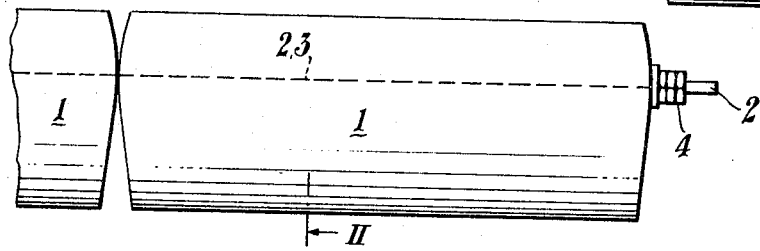
Figure 4:
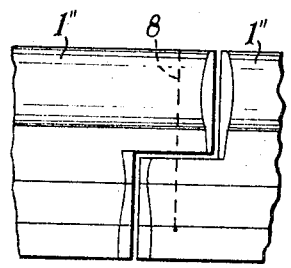
Figure 5:
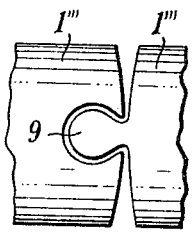
FIG. 5 is a top plane view, also in reduced scale, of part of two elements of a fourth embodiment of the barrier.

Obviously, various modifications and changes could be devised by skilled people to the embodiments, which have been only shown of the present invention, without departing from the scope of the present invention. Thus, for instance, the mutual connection of the various elements of the barrier can be obtained by a vertical pin, as diagrammatically indicated by the dotted line 8 of FIG. 4, said pin being engaged within bores pierced through projecting parts of the two next adjoining elements 1''. Said connection can also be embodied by a dovetail joint as shown at 9 for the two adjoining elements 1''' of FIG. 5.

It is understood that these and all other modifications which do not depart from the spirit of this invention come within the scope of the invention itself.

We claim:

1. A safety barrier for roadways comprising in combination a plurality of heavy elements simply resting on the ground one beside the other, connecting means passing through at least one longitudinal bore of each of said elements, said elements having side faces matching with one another and shaped to allow a slight mutual rotation of said elements about vertical axes and locking means for tensioning and locking the ends of said connecting means projecting from the bores of the first and last heavy element.

2. A safety barrier as claimed in claim 1, wherein said connecting means are ropes.

References Cited

UNITED STATES PATENTS

| | | | |
|---|---|---|---|
| 1,606,588 | 11/1926 | Meermans | 94—31 |
| 2,931,279 | 4/1960 | Wiswell | 94—1.5 |
| 2,994,255 | 8/1961 | Trief | 94—1.5 X |
| 3,037,433 | 6/1962 | Maher | 94—31 |
| 3,082,994 | 3/1963 | Rasmussen | 256—13.1 |
| 3,194,537 | 7/1965 | Gerin | 256—13.1 |

CHARLES E. O'CONNELL, *Primary Examiner.*

N. C. BYERS, *Assistant Examiner.*